US009892176B2

(12) United States Patent
Cortes

(10) Patent No.: US 9,892,176 B2
(45) Date of Patent: Feb. 13, 2018

(54) METHOD AND APPARATUS FOR PROVIDING A SMART ADDRESS FINDER

(71) Applicant: HERE Global B.V., Veldhoven (NL)

(72) Inventor: Francisco Cortes, Berlin (DE)

(73) Assignee: HERE Global B.V., Veldhoven (NL)

( * ) Notice: Subject to any disclaimer, the term of this patent is extended or adjusted under 35 U.S.C. 154(b) by 202 days.

(21) Appl. No.: 14/011,360

(22) Filed: Aug. 27, 2013

(65) Prior Publication Data

US 2015/0066962 A1  Mar. 5, 2015

(51) Int. Cl.
G06F 17/30 (2006.01)
H04W 4/02 (2009.01)

(52) U.S. Cl.
CPC .... G06F 17/3056 (2013.01); G06F 17/30241 (2013.01); H04W 4/025 (2013.01)

(58) Field of Classification Search
None
See application file for complete search history.

(56) References Cited

U.S. PATENT DOCUMENTS

| | | | |
|---|---|---|---|
| 6,115,754 A | | 9/2000 | Landgren |
| 7,085,629 B1 * | | 8/2006 | Gotou et al. ............ 701/1 |
| 2007/0150173 A1 * | | 6/2007 | Neef ............ G01C 21/362 701/425 |
| 2008/0036586 A1 | | 2/2008 | Ohki |
| 2008/0086455 A1 * | | 4/2008 | Meisels ............ G01C 21/26 |
| 2008/0133599 A1 * | | 6/2008 | Stewart et al. ........... 707/104.1 |
| 2009/0005072 A1 | | 1/2009 | Forstall et al. |

| | | | |
|---|---|---|---|
| 2011/0087839 A1 * | 4/2011 | Sharma et al. ............ 711/118 |
| 2011/0161427 A1 | 6/2011 | Fortin et al. |
| 2012/0089331 A1 * | 4/2012 | Schmidt ............ G01C 21/362 701/445 |

(Continued)

FOREIGN PATENT DOCUMENTS

| | | |
|---|---|---|
| EP | 2081369 A1 | 1/2008 |
| WO | WO2009015482 A1 | 2/2009 |

OTHER PUBLICATIONS

Extended European Search Report corresponding to European Application No. 14175333.5-1952, dated Feb. 26, 2015; 7 pages.

(Continued)

*Primary Examiner* — Aleksandr Kerzhner
*Assistant Examiner* — Eddy Cheung
(74) *Attorney, Agent, or Firm* — Ditthavong & Steiner, P.C.

(57) ABSTRACT

An approach is provided for parsing one or more communications to determine location details and to make those details available to one or more applications that can enable a user to determine how and when to get to a particular location. A parsing platform causes, at least in part, a parsing of one or more communications to determine one or more indicators of at least one location, wherein the one or more communications are associated with at least one application. The parsing platform causes a storage of the one or more indicators in at least one database based, at least in part, on the at least one application. The parsing platform further causes, at least in part, a granting of access to the at least one database to at least one other application for determining the at least one location based, at least in part, on the one or more indicators.

20 Claims, 13 Drawing Sheets

(56) References Cited

U.S. PATENT DOCUMENTS

| | | | | |
|---|---|---|---|---|
| 2012/0210253 A1* | 8/2012 | Luna | ................... | G06Q 10/107 |
| | | | | 715/753 |
| 2012/0221239 A1* | 8/2012 | Cooper | .................. | H04W 4/02 |
| | | | | 701/409 |
| 2013/0226453 A1* | 8/2013 | Trussel | .................. | H04L 51/20 |
| | | | | 701/533 |
| 2014/0195469 A1* | 7/2014 | Barrett | ................ | G01C 21/362 |
| | | | | 706/46 |

OTHER PUBLICATIONS

"Geotagging with Local Lexicons to Build Indexes for Textually-Specified Spatial Data", M. Lieberman et al.; Data Engineering (ICDE), 2010 IEEE Conference; 12 pages.

"Geo-parsing Messages from Microtext", J. Gelernter et al., Transactions in GIS, 2011; 21 pages.

Office Action for corresponding European Patent Application No. 14175333.5-1952, dated Jan. 12, 2016, 8 Pages.

\* cited by examiner

METHOD AND APPARATUS FOR PROVIDING A SMART ADDRESS FINDER

BACKGROUND

Service providers and device manufacturers (e.g., wireless, cellular, etc.) are continually challenged to deliver value and convenience to consumers by, for example, providing compelling network services. One area of interest has been the development of location-based services (e.g., mapping and/or navigation applications) that can provide users of mobile devices (e.g., a mobile or a tablet) with location information and/or route guidance between locations such as a home or office and a new restaurant, for example. A common way to inform or share details among users about an address or a location (e.g., of an appointment or an event) is to transmit the information via one or more communication types (e.g., email, short messaging service (SMS), voicemail, social networking services, etc.). However, when a user sends the information via email, for example, there is generally no easy way to display the location directly on a map (e.g., a mapping and/or navigation application). The task is further complicated when a user is limited to mobile device as opposed to a desktop personal computer (PC), for example. By way of example, a user may be required to manually input an address into the mapping and/or navigation application by copying and pasting the location details between applications. Accordingly, service providers and device manufacturers face significant technical challenges in providing a service that can parse one or more communications to determine location details and to make those details available to one or more applications that can enable a user to determine how and when to get to the location.

SOME EXAMPLE EMBODIMENTS

Therefore, there is a need for an approach for parsing one or more communications to determine location details and to make those details available to one or more applications that can enable a user to determine how and when to get to a particular location.

According to one embodiment, a method comprises causing, at least in part, a parsing of one or more communications to determine one or more indicators of at least one location, wherein the one or more communications are associated with at least one application. The method also comprises causing, at least in part, a storage of the one or more indicators in at least one database based, at least in part, on the at least one application. The method further comprises causing, at least in part, a granting of access to the at least one database to at least one other application for determining the at least one location based, at least in part, on the one or more indicators.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a parsing of one or more communications to determine one or more indicators of at least one location, wherein the one or more communications are associated with at least one application. The apparatus also causes, at least in part, a storage of the one or more indicators in at least one database based, at least in part, on the at least one application. The apparatus further causes, at least in part, a granting of access to the at least one database to at least one other application for determining the at least one location based, at least in part, on the one or more indicators.

According to another embodiment, a computer-readable storage medium carries one or more sequences of one or more instructions which, when executed by one or more processors, cause, at least in part, an apparatus to cause, at least in part, a parsing of one or more communications to determine one or more indicators of at least one location, wherein the one or more communications are associated with at least one application. The apparatus also causes, at least in part, a storage of the one or more indicators in at least one database based, at least in part, on the at least one application. The apparatus further causes, at least in part, a granting of access to the at least one database to at least one other application for determining the at least one location based, at least in part, on the one or more indicators.

According to another embodiment, an apparatus comprises means for causing, at least in part, a parsing of one or more communications to determine one or more indicators of at least one location, wherein the one or more communications are associated with at least one application. The apparatus also comprises means for causing, at least in part, a storage of the one or more indicators in at least one database based, at least in part, on the at least one application. The apparatus further comprises means for causing, at least in part, a granting of access to the at least one database to at least one other application for determining the at least one location based, at least in part, on the one or more indicators.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for parsing one or more communications to determine location details and to make those details available to one or more applications that can enable a user to determine how and when to get to a particular location are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
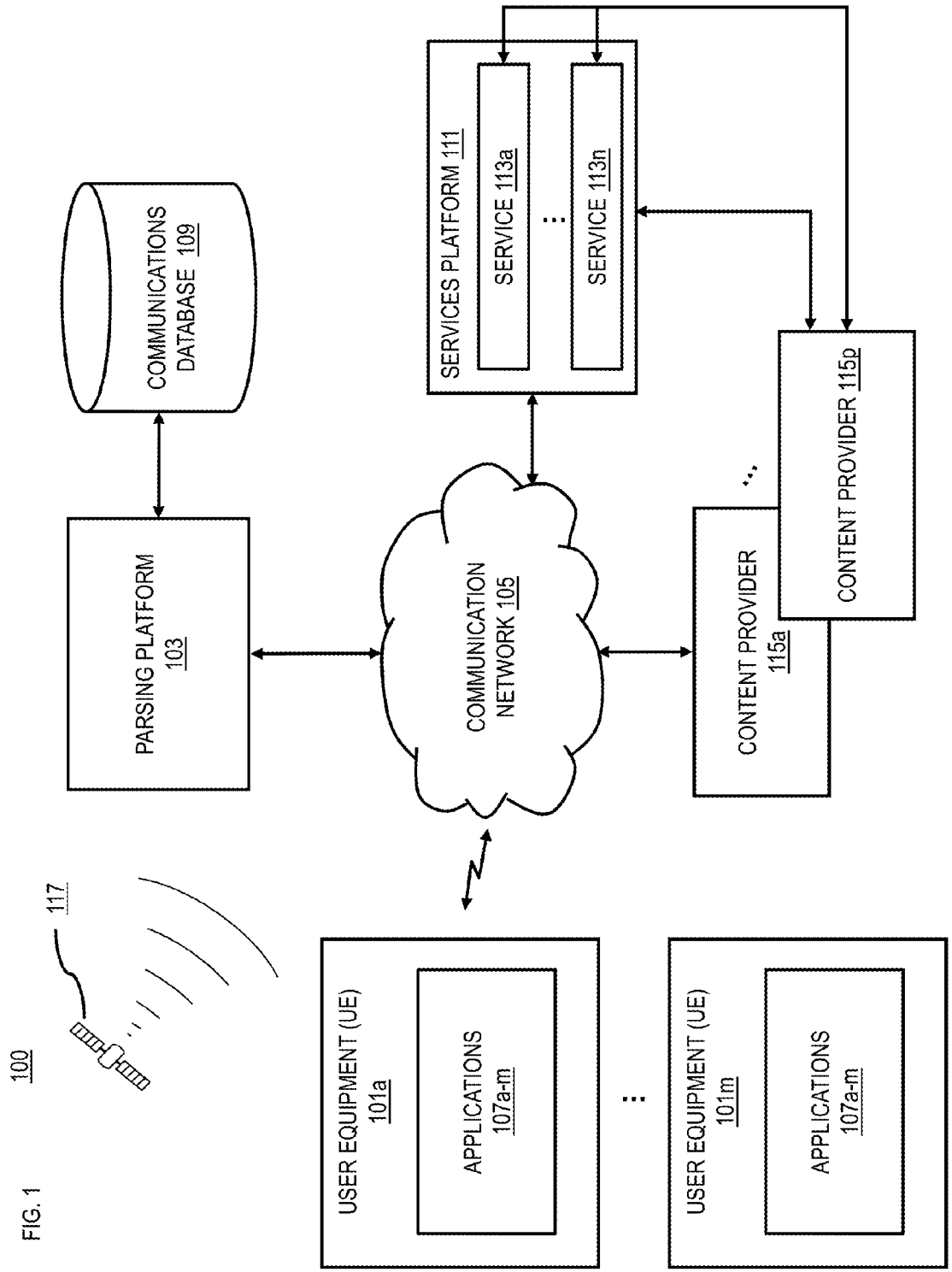
FIG. 1 is a diagram of a system capable of parsing one or more communications to determine location details and to make those details available to one or more applications that can enable a user to determine how and when to get to a particular location, according to one embodiment.

FIG. 1 is a diagram of a system capable of parsing one or more communications to determine location details and to make those details available to one or more applications that can enable a user to determine how and when to get to a particular location, according to one embodiment. As previously discussed, one area of interest among service providers and device manufacturers has been the development of location-based services (e.g., mapping and/or navigation applications) that can provide users of mobile devices with location information and/or route guidance between locations such as a home or office and a new restaurant, an apartment viewing, a birthday party, etc. A common way to inform or share details among users about an address or location is to transmit the information using one or more communication types (e.g., email, SMS, voicemail, social networking services, etc.). However, when someone sends the information via email or SMS, for example, there is generally no easy way to display the location on a map (e.g., a mapping and/or navigation application). The task is further complicated when a user is limited to a mobile device as opposed to a desktop PC, for example. By way of example, a user may be looking for a new apartment and is contacted by his or her real-estate agent via email regarding an upcoming appointment to see an apartment on a specific date and time (e.g., on Thursday May $23^{rd}$ at 6:00 p.m. at Senefelder Strasse 7, Prenzlauer Berg). As a result, the user may open a mapping and/navigation application, for example, to copy and paste the address to understand where the appointment is located and how to get there. This process can easily take a few minutes and becomes more tedious when the user is limited to his or her mobile device as opposed to a desktop PC.

To address this problem, a system 100 of FIG. 1 introduces the capability to parse one or more communications to determine location details and to make those details available to one or more applications that can enable a user to determine how and when to get to a particular location. As shown in FIG. 1, the system 100 comprises one or more user equipment (UE) 101a-101m (e.g., mobile phones, tablets, desktop PCs, etc.) (also collectively referred to as UEs 101) having connectivity to a parsing platform 103 via a communication network 105. The UEs 101 also include or have access to one or more applications 107a-107m (also collectively referred to as applications 107). By way of example, the applications 107 include a mapping and/or navigation application, an email application, a messaging application (e.g., SMS, multimedia messaging service (MMS), etc.), a voicemail application, social networking applications, an Internet browser, media applications, etc.

In one embodiment, the parsing platform 103 may include or be associated with at least one communications database 109, which may exist in whole or in part within the parsing platform 103. In one example embodiment, the parsing platform 103 may exist in whole or in part with within a UE 101, or independently. The at least one communications database 109 may include one or more lists of locations, addresses, times, dates, senders, credentials (e.g., a username and/or a password), etc. In addition, the parsing platform 103 may include or have access to one or more point-of-interest (POI) databases and/or one or more other databases (e.g., an address book or a contacts list, a geocoding database, etc.). Further, in one embodiment, the one or more lists may be organized within the at least one communications database 109 based, at least in part, on a location of the information within the one or more communications (e.g., a subject, a header, a message body, a footer, etc. of an email) as well as a status of the one or more communications (e.g., unread, read, and/or deleted, etc.). More specifically, in one embodiment, when one or more communications are read by a user, the one or more location details of the one or more communications may become public in the at least one communications database 109.

The UEs 101 are also connected to a services platform 111 via the communication network 105. In one embodiment, the services platform 111 includes one or more services 113a-113n (also collectively referred to as services 113). By way of example, the services 113 may include mapping and/or navigation services, transportation-related services (e.g., public transportation schedules and/or timetables), social networking services, etc. In one embodiment, the UEs 101, the services platform 111, and the services 113 also have connectivity to one or more content providers 115a-115p (also collectively referred to as content providers 115). The content providers 115 may provision a wide variety of content (e.g., maps, navigation routes, POI information, etc.) to the components of the system 100.

In certain embodiments, the parsing platform 103 and/or the applications 107 (e.g., a mapping and/or navigation application) may utilize one or more location-based technologies (e.g., global positioning system (GPS), cellular triangulation, Assisted GPS (A-GPS), etc.) to make a request to one or more services 113 for location-based data (e.g., the GPS location of a UE 101, mapping and/or navigation information, etc.) based on a position relative to the UE 101. For example, a UE 101 may include a GPS receiver to obtain geographic coordinates from the satellites 117 to determine its current location. In one embodiment, wherein a UE 101 is a desktop PC, the parsing platform 103 can determine the location of the device based, at least in part, on its internet protocol (IP) address.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network (e.g., a proprietary cable or fiber-optic network, and the like, or any combination thereof). In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), short-wavelength radio or BLUETOOTH®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the system 100 determines one or more credentials (e.g., a login and/or a password) associated with at least one application of a user (e.g., an email application, an SMS messaging application, a voicemail application, a social networking application, etc.). More specifically, the user grants the system 100 access to one or more communications associated with the at least one application and/or to one or more other databases associated with the user (e.g., an address book or a contacts list) to enable the system 100 to parse the one or more communications (e.g., emails).

In one embodiment, the system 100 causes, at least in part, a parsing of the one or more communications to determine one or more indicators of at least one location (e.g., an address of a birthday party). In one example use case, a communication (e.g., an email) may include the following message: "the birthday party will take place on Thursday 23$^{rd}$ of May at 6:00 p.m. in Senefelder Strasse 7, Prenzlauer Berg." In one embodiment, the system 100 first causes, at least in part, a parsing of the communication to determine the address "Senefelder Strasse 7." By way of example, the system 100 causes, at least in part, a parsing of the one or more communications based, at least in part, on determining one or more specific patterns within the one or more communications. For example, the system 100 can check for one or more key words in each language (e.g., street, strasse, calle, drive, avenue, road, etc.), a number coming before or after the key word, a comma separating the key word or number, a city, a postcode, a country, or any combination thereof following the number and/or key word.

In one or more embodiments, the system 100 determines whether the one or more indicators are unambiguous, ambiguous, a POI, a common location expression (e.g., "my home, "my place," etc.), or a combination thereof based, at least in part, on at least one comparison of the one or more indicators against one or more entries in at least one database (e.g., the at least one communications database 109), one or more other databases (e.g., a POI database, an address book or contacts list, a geo-coding database, etc.), or a combination thereof. By way of example, the system 100 can determine that an indicator is a street address based, at least in part, on a geo-coding database and that the street address is ambiguous (i.e., this street name is located in more than one city) based, at least in part, on the geo-coding database as well. In the example use case discussed above, the system 100 determines that the street address Senefelder Strasse 7 is ambiguous because it can be found in at least Berlin and Fredersdorf-Vogelsdorf as well as a number of other cities located throughout Germany.

In one embodiment, the system 100 causes, at least in part, a storage of the one or more indicators in at least one database (e.g., the communications database 109) based, at least in part, on the at least one application (e.g., an email application). More specifically, if the system 100 determines that the address (e.g., Senefelder Strasse 7) is not ambiguous (i.e., not located in multiple cities, areas, etc.), then the system 100 can add the address to the at least one database and may then try to determine one or more contextual parameters associated with the at least one location (e.g., a date, a time, etc.). By way of example, the system 100 can cause, at least in part, the storage of the one or more indicators in the at least one database based, at least in part, on one or more communication types (e.g., email, SMS, voicemail, social networking services, etc.) and/or one or more service providers of the one or more types of communication. For example, in one example use case, the at least one database may include recent addresses determined from the following communications: Email A (2), Social Network B (3), Social Network C (0), SMS (1), and Voicemail (1). In addition, the one or more address may be based, at least in part, on one or more communications received during the last day, week, month, etc. and the system 100 can enable a user to configure the applicable time period.

In one or more embodiments, wherein the one or more indicators (e.g., an address) are ambiguous, the system 100 determines location information associated with at least one device associated with the one or more communications (i.e., the device receiving the one or more communications). For example, as previously discussed, the street address Senefelder Strasse 7 is located in at least two different cities (e.g., Berlin and Fredersdorf-Vogelsdorf). Consequently, the system 100 determines the location information associated with the at least one device (e.g., GPS coordinates of a mobile device or an IP address of a desktop PC). In the example use case discussed above, the system 100 determines that the at least one device (e.g., a mobile phone) is located in Berlin.

Figure 6:
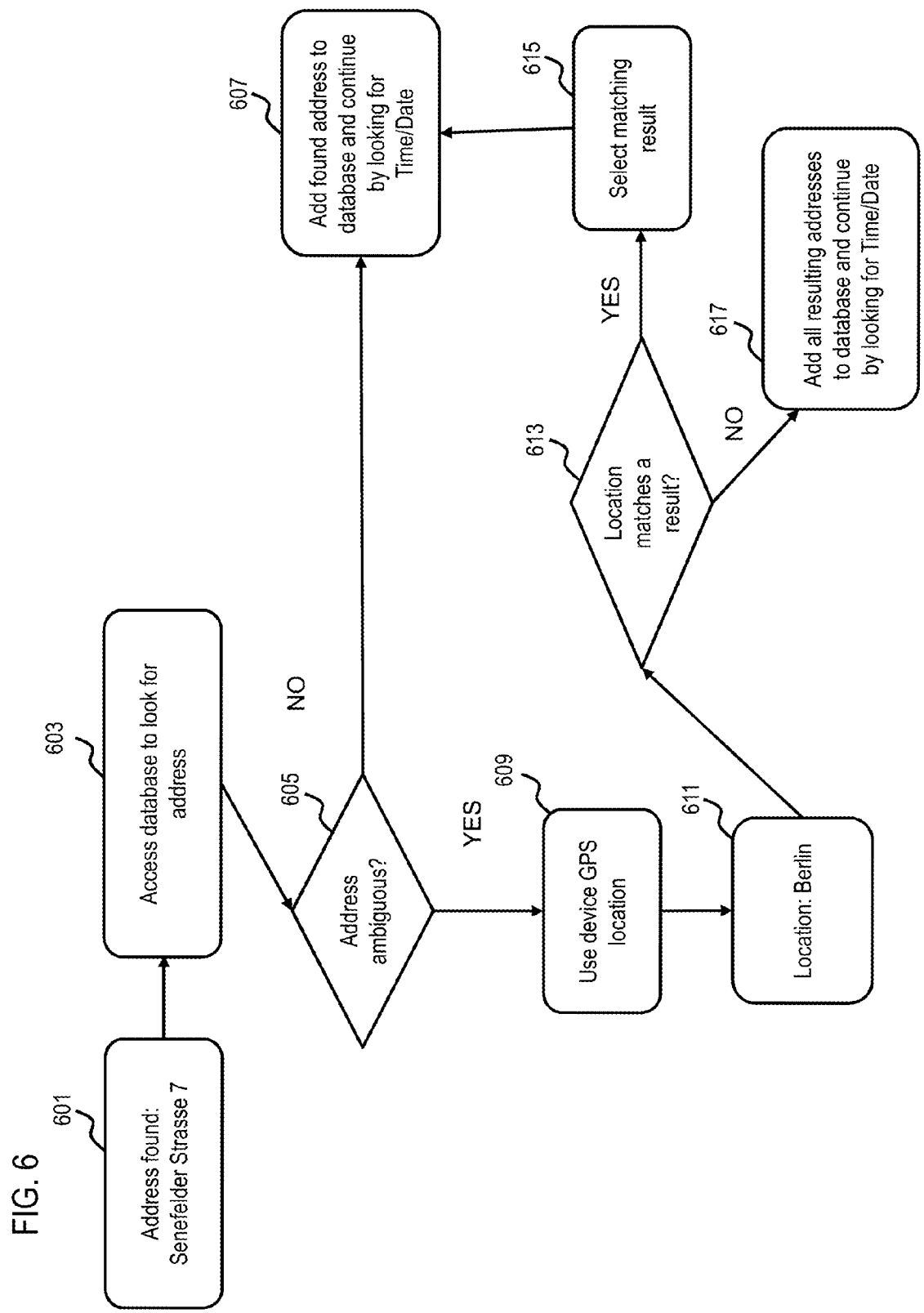
FIGS. 6-8 are diagrams of workflows for determining at least one location, according to various embodiments.

In one embodiment, the system 100 causes, at least in part, at least one comparison of the one or more indicators (e.g., an address) against the location information, the one or more other databases (e.g., a geo-coding database), or a combination thereof to determine whether the one or more indicators match the determined location information. For example, in the example use case discussed above, the system 100 determines that the at least one device is in Berlin and that Senefelder Strasse 7 matches an address in Berlin. Therefore, in one embodiment, the system 100 selects the address Senefelder Strasse 7, Berlin and causes, at least in part, a storage of the address in the at least one database (e.g., the communications database 109). In one embodiment, if the system 100 determines that the one or more indicators do not match the location information, then the system 100 causes, at least in part, a storage of all resulting addresses in the at least one database. An illustrative example of the workflow for determining at least one location is depicted in FIG. 6.

Figure 7:
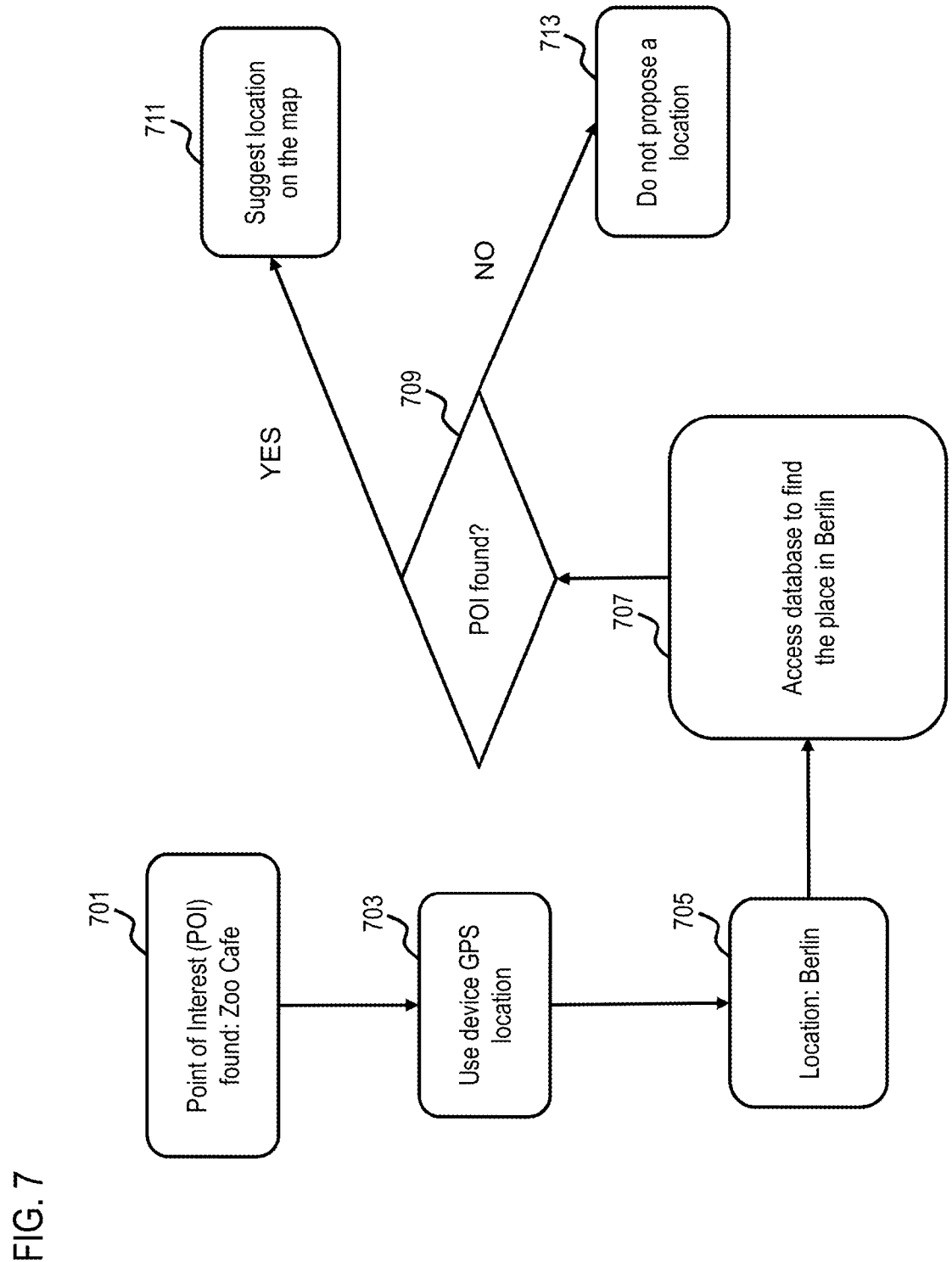

In one embodiment, wherein the system 100 determines that the one or more indicators is a POI or a common location expression, the system 100 determines the at least one location based, at least in part, on the location information (e.g., GPS coordinates of a UE 101), the one or more other databases (e.g., a POI database, a geo-coding database, an address book or contacts list, etc.), or a combination thereof. For example, in one example use case, the system 100 causes, at least in part, a parsing of the communication "Hey, we are meeting in Zoo Cafe at 7:00 p.m." to determine that the communication includes a POI, Zoo Cafe, instead of an address. In one embodiment, the system 100 determines the location information (e.g., GPS coordinates) associated with the at least one device (e.g., a mobile phone) to reduce the scope of the comparison between the one or more indicators and the one or more other databases. In one embodiment, the system 100 then causes, at least in part, at least one comparison of the POI Zoo Cafe against at least one POI database to determine whether the POI is also located in Berlin. In one embodiment, if the system 100 determines that the POI is not located in Berlin, then the system 100 discontinues processing the one or more indicators. However, if the system 100 determines that the POI is also located in Berlin, then system 100 causes, at least in part, a storage of the address of the POI in the at least one database (e.g., the communications database 109). An illustrative example of the workflow for determining a POI is depicted in FIG. 7.

Figure 8:
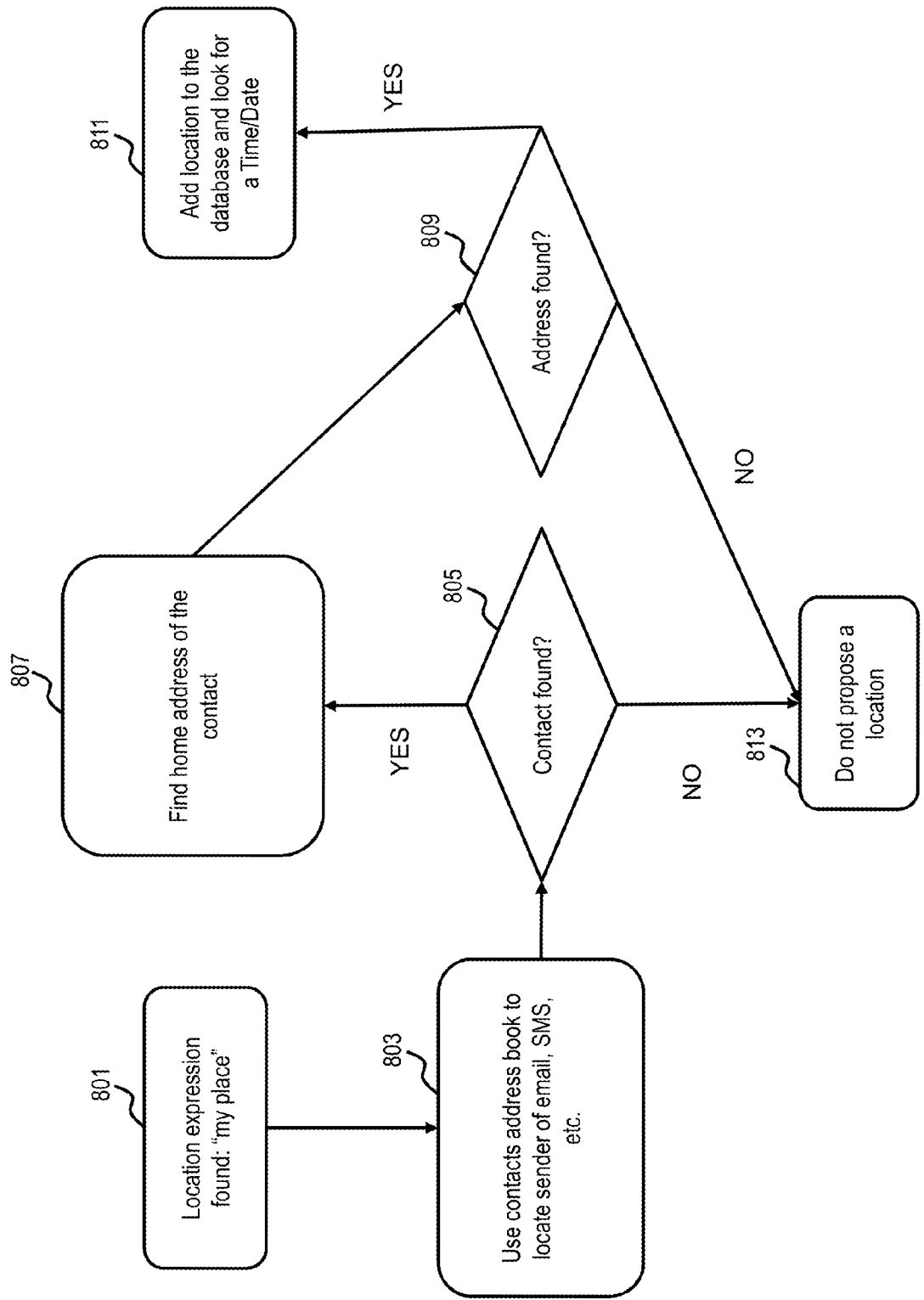

In another example use case, the system 100 causes, at least in part, a parsing of the communication "Hey, we are meeting at my place at 7:00 p.m." to determine that the communication includes a common location expression "my place" instead of an address. In one embodiment, the system 100 causes, at least in part, a parsing of the one or more communications to determine the sender of the particular communication and then causes, at least in part, a comparison of the sender against one or more entries in one or more other databases such as an address book or contacts list. In one embodiment, if the system 100 is unable to match the sender against the one or more entries, then the system 100 discontinues processing the one or more indicators. However, if the system 100 determines that the sender is among the one or more entries, then the system 100 attempts to determine at least one location for the sender. In this example use case, if the system 100 is unable to determine at least one location, then the system 100 discontinues processing the one or more indicators. However, if the system 100 determines at least one location for the sender, then the system 100 causes, at least in part, the storage of the location in the at least one database (i.e., the address of the sender's place). An illustrative example of the workflow for determining a common location expression is depicted in FIG. 8.

In one or more embodiments, wherein the at least one location or address is associated with at least one appointment or event (e.g., a birthday party, a dinner reservation, etc.), the system 100 causes, at least in part, a parsing of the one or more communications to determine at least one contextual parameter associated with the at least one appointment (e.g., a date, a time, a sender, etc.). For example, in one example use case, once the system 100 determines the one or more indicators of the at least one location (e.g., an address), then the system 100 can automatically determine at least one contextual parameter associated with the at least one appointment (assuming such parameters exist within the communication). More specifically, in the example use case discussed above, the contextual parameters of the communication would include "Thursday the 23$^{rd}$ of May" and "6:00 p.m." Further, similar to parsing the one or more communications to determine the one or more indicators, the system 100 is able to cause, at least in part, a parsing of the one or more communications to determine one or more contextual parameters based, at least in part, on one or more patterns. For example, three (3) or four (4) numbers HHMM in the format HHMM, HH:MM, HH.MM, H.MM, H:MM, etc. and the numbers may also include related keywords (e.g., "o'clock," "a.m.," "p.m.," etc.).

In one embodiment, the system 100 causes, at least in part, a granting of access to the at least one database to at least one other application (e.g., a mapping and/or navigation application, an SMS application, a social networking application, etc.) for determining the at least one location based, at least in part, on the one or more indicators. For example, the system 100 can cause, at least in part, a granting of access to a mapping and/or navigation application so that a user can visually determine, for example, how and when to get to a location contained within the one or more communications parsed by the system 100.

In one or more embodiments, the system 100 causes, at least in part, a presentation of the at least one location via the at least one other application, wherein the presentation is based, at least in part, on the at least one application. For example, the system 100 may present the birthday party communication discussed above as "SenefelderPlatz 7, 6:00 p.m. Sent by name@mail.com 11$^{th}$ April 3:38 p.m." in connection with a mapping and/or navigation application. In one embodiment, a user can then click on a list item, for example, and the system 100 can cause, at least in part, the at least one other application (e.g., a mapping and/or navigation application) to center the address on a map of the relevant area. In one embodiment, in addition to centering the at least one location on the map of the relevant area, the system 100 can also cause, at least in part, a presentation of the communication containing the at least one location to assist the user to understand the context of the at least one location (e.g., an address of a birthday party, or a restaurant reservation, etc.). In one embodiment, the system 100 can determine the location information of the at least one device (e.g., GPS coordinates) and because the system 100 can determine the time of the party, the system 100 can present route guidance information from the location of the at least one device to the location of the birthday party, for example. In one embodiment, the system 100 can also present the route guidance information in connection with one or more transit methods that the user can select among (e.g., a car, a bus, a subway, etc.). In one example use case, the system 100 can provide additional route guidance information (e.g., when the user should leave to arrive to the birthday party on time) based, at least in part, on a bus schedule, for example. In one embodiment, if the system 100 determines that the one or more communications did not include a time (e.g., the time of the birthday party), then the system 100 can assume that the user may likely leave for the location now. In one embodiment, the system 100 can also enable a user to enter a time and/or location when and where the user wants to leave from for the birthday party as opposed to the current location of the at least one device.

In one embodiment, the system 100 can process and/or facilitate a processing of the one or more communications (e.g., one or more emails) to determine at least one status of the one or more communications (e.g., "read," "unread," and/or "deleted"), wherein the storage of the one or more indicators, the presentation of the one or more indicators, or a combination thereof is based, at least in part, on the status. More specifically, in one embodiment, the system 100 functions as a daemon, running in the background of the at least one device. Consequently, the system 100 can cause, at least in part, a parsing of the one or more communications in substantially real-time, periodically, according to a schedule, on demand, or a combination thereof. For example, the system 100 may "wake up" and process the one or more communications every minute. Therefore, the system 100 can cause, at least in part, a parsing of one or more communications (e.g., emails) that a user has not already read. In that case, the system 100 will still cause, at least in part, the storage of the one or more indicators based, at least in part, on the status of the one or more communications. Further, once the user reads the one or more unread communications, the system 100 can determine the change of status and the system 100 can make the one or more indicators available to the at least one other application (e.g., a mapping and/or navigation application).

In one embodiment, the system 100 can process and/or facilitate a processing of the one or more communications to determine at least one placement of the one or more indicators within the one or more communications, wherein the storage of the one or more indicators, the presentation of the at least one location, or a combination thereof is further based, at least in part, on the at least one placement. By way of example, once the system 100 determines an address, for example, one or more communications (e.g., an email), the system 100 can then determine where the address appeared in the email (e.g., the subject, the header, the message body, the footer, etc.). Thereafter, the system 100 can cause, at least in part, the storage of the one or more indicators along with its location in the at least one database (e.g., the communications database 109).

By way of example, the UEs 101, the parsing platform 103, the applications 107, the at least one communications database 109, the services platform 111, the services 113, the content providers 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
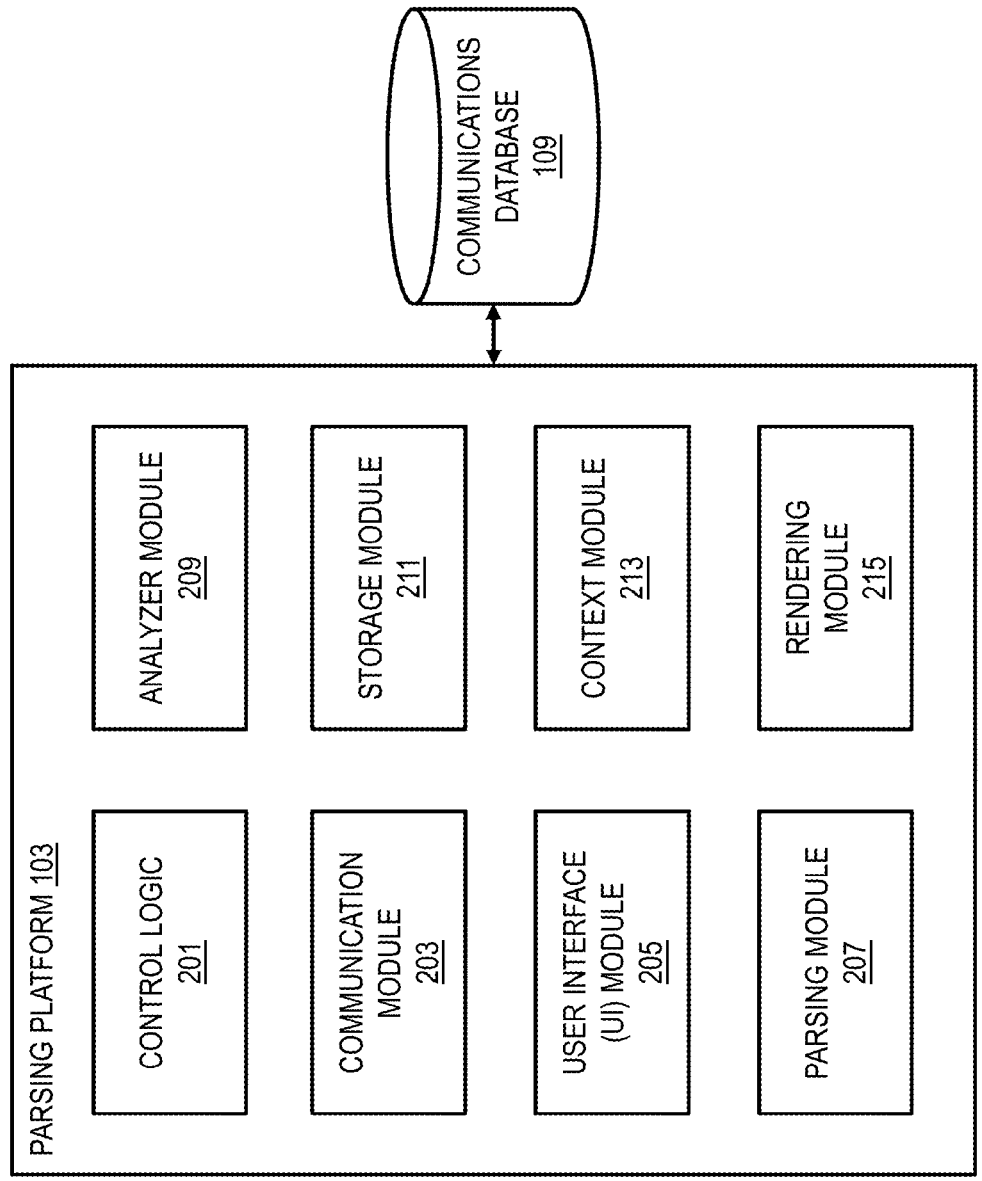
FIG. 2 is a diagram of the components of a parsing platform, according to one embodiment.

FIG. 2 is a diagram of the components of the parsing platform 103, according to one embodiment. By way of example, the parsing platform 103 includes one or more components for parsing one or more communications to determine location details and to make those details available to one or more applications that can enable a user to determine how and when to get to a particular location. It is contemplated that the functions of these components may be combined in one or more components or performed by other components of equivalent functionality. In this embodiment, the parsing platform 103 includes a control logic 201, a communication module 203, a user interface (UI) module 205, a parsing module 207, an analyzer module 209, a storage module 211, a context module 213, and a rendering module 215.

In one embodiment, the control logic 201 oversees tasks, including tasks performed by the communication module 203, the UI module 205, the parsing module 207, the analyzer module 209, the storage module 211, the context module 213, and the rendering module 215. For example, although the other modules may perform the actual task, the control logic 201 may determine when and how those tasks are performed or otherwise direct the other modules to perform the task. In one or more embodiments, the control logic 201, in connection with the communication module 203, causes, at least in part, a granting of access to the at least one database to at least one other application (e.g., a mapping and/or navigation application, an SMS messaging application, a social networking application, etc.) for determining the at least one location based, at least in part, on the one or more indicators.

The communication module 203 in certain embodiments is used for communication between the UEs 101, the parsing platform 103, the applications 107, the at least one communications database 109, the services platform 111, the services 113, the content providers 115, and the satellites 117. The communication module 203 may also be used to process and/or facilitate a processing of the one or more communications to determine at least one status of the one or more communications (e.g., read, unread, and/or deleted).

In one embodiment, UI module 205 is used to determine one or more credentials (e.g., a username and/or a password) associated with the at least one application. By way of example, the access of the system 100 to the contents of the one or more communications is granted by a user (e.g., granting the parsing platform 103 access to one or more social networking applications). In one embodiment, it is contemplated that the UI module 205 requests that the user permit access to the one or more communication channels (e.g., email, SMS, voicemail, social networking) and permit access to the user's address book and/or a contacts list.

The parsing module 207 is used in certain embodiments to cause, at least in part, a parsing of the one or more communications (e.g., email, SMS, voicemail, social networking posts, etc.) to determine one or more indicators (e.g., a street address, a point of interest, a common location expression) of at least one location. In particular, the parsing module parses the one or more communications based, at least in part, on one or more patterns within the one or more communications. For example, key words such as street, strasse, calle, drive, avenue, road, etc. preceded or followed by a number. Wherein the at least one location is associated with at least one appointment, the parsing module 207 may also be used to cause, at least in part, a parsing of the one or more communications to determine at least one contextual parameter associated with the at least one appointment (e.g., a date, a time, a sender, etc.). Again, the parsing module 207 parses the one or more communications based, at least in part, on one or more patterns within the one or more communications. For example, a pattern related to time may include three (3) or four (4) numbers HHMM in the format: HHMM, HH:MM, HH.MM, H.MM, H:MM, etc. In addition, a pattern related to time may also include one or more keywords such as "o'clock," "a.m.," "p.m.," etc.

In one embodiment, the analyzer module 209 is used to determine whether the one or more indicators are unambiguous, ambiguous, a POI, a common location expression, or a combination thereof based, at least in part, on at least one comparison of the one or more indicators against one or more entries in the at least one database (e.g., the communications database 109), the one or more other databases (e.g., a POI database, a geo-coding database, an address book or contacts list), or a combination thereof. For example, if the analyzer module 209 determines that a street address (e.g., Senefelder Strasse 7) is located in more than one city (e.g., Berlin and Fredersdorf-Vogelsdorf), then the analyzer module 209 can determine that the address is ambiguous. The analyzer module 209 may also be used to cause, at least in part, at least one comparison of the one or more indicators against the location information, the one or more other databases, or a combination thereof to determine whether the one or more indicators match the location information. By way of example, the analyzer module 209 can determine whether the determined address Senefelder Strasse 7 matches one or more GPS coordinates associated with a device (e.g., Berlin). Wherein the one or more indicators are a POI or a common location expression, the analyzer module 209 may also be used to determine the at least one location based, at least in part, on the location information, the one or more other databases, or a combination thereof. Further, the analyzer module 209 also may be used to process and/or facilitate a processing of the one or more communications to determine at least one placement of the one or more indicators within the one or more communications (e.g., within the subject, the header, the body, the footer, etc. of an email).

In one embodiment, the storage module 211 is used to manage the storage of the one or more lists of locations, addresses, times, dates, senders, credentials, etc. from the one or more parsed communications stored in the at least one communications database 109. The storage module 211 may also be used to cause, at least in part, a storage of the one or more indicators in the at least one database based, at least in part, on at least one application (e.g., email, SMS, etc.), at least one status (e.g., read, unread, and/or deleted), at least one location (e.g., the subject, the header, the body, the footer, etc. of an email), or a combination thereof.

In one or more embodiments, the context module 213, in connection with the communications module 203, is used to determine location information associated with at least one device associated with the one or more communications (e.g., GPS coordinates of the device receiving the one or more communications). By way of example, if the at least one device is a mobile device (e.g., a mobile phone or a tablet), then the content module 213 can determine the location information based, at least in part, on one or more location-based technologies (e.g., GPS, cellular triangulation, A-GPS, etc.) and if the at least one device is a desktop PC, for example, then the context module 213 can determine the location information based, at least in part, on the IP address of the device.

In one embodiment, the rendering module 215, in connection with the UI module 205, is used to cause, at least in part, a presentation of the at least one location via the at least one other application (e.g., a mapping and/or navigation application). For example, in one example use case, when a user clicks on one or more of the address lists (e.g., SenefelderPlatz 7, 6:00 p.m. Sent by name@mail.com 11$^{th}$ April 3:38 p.m.), the rendering module 215 centers the address on a mapping and/or navigation application, for example.

Figure 3:
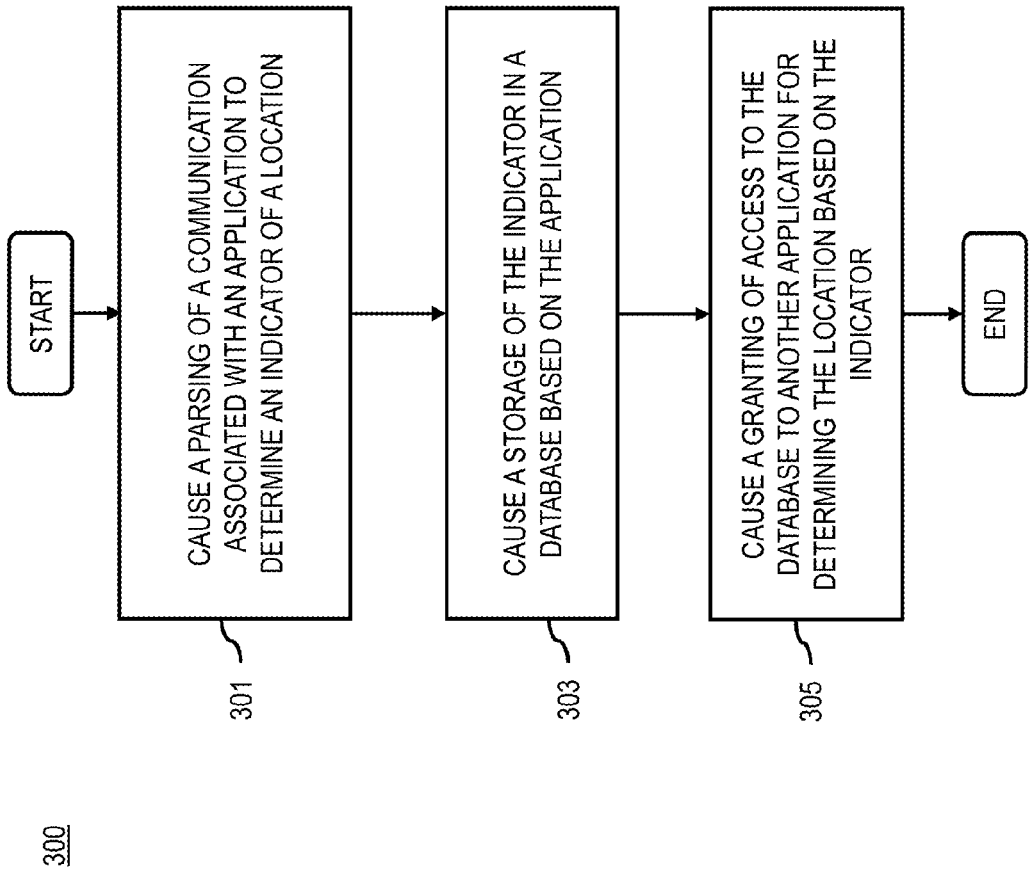
FIGS. 3-5 are flowcharts of processes for parsing one or more communications to determine location details and to make those details available to one or more applications that can enable a user to determine how and when to get to a particular location, according to one embodiment.
Figure 4:
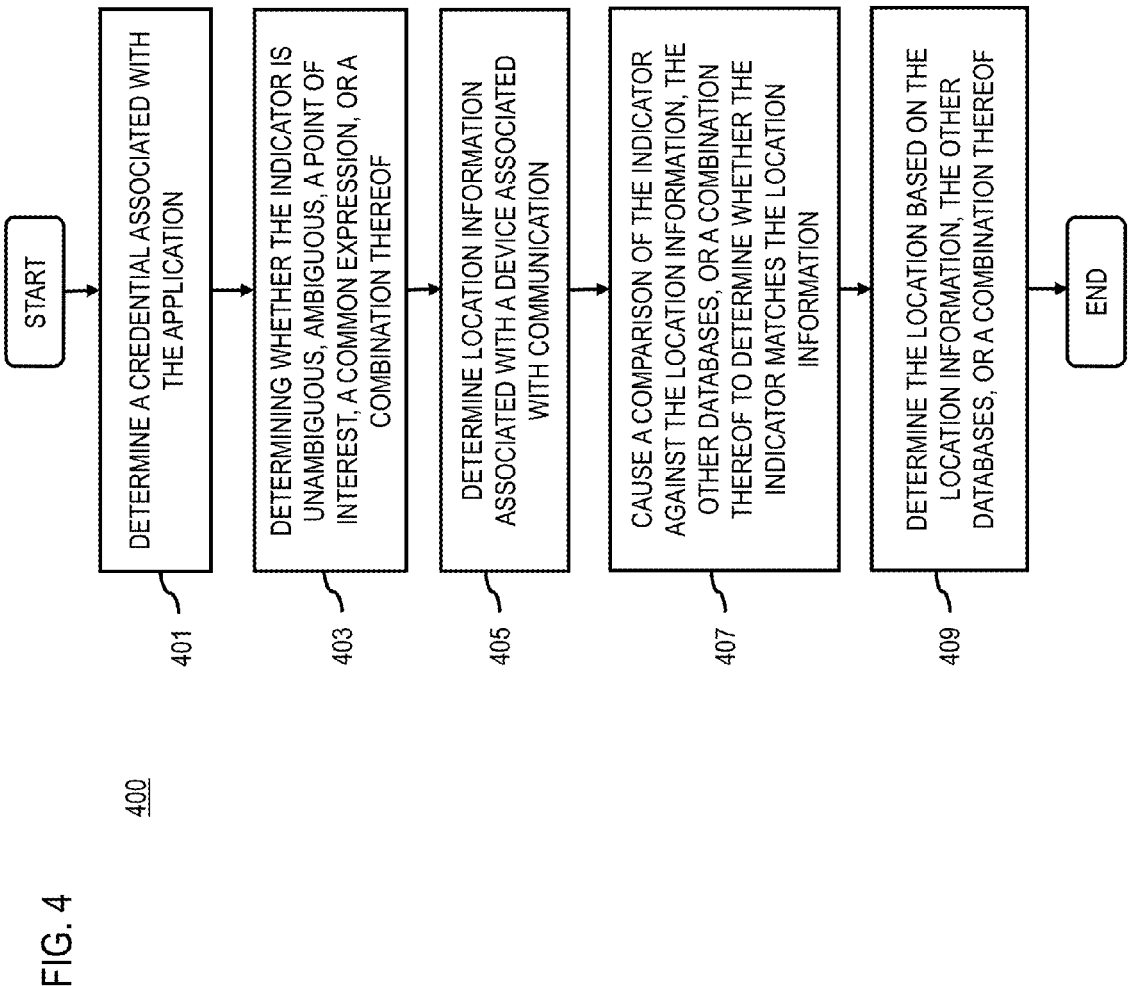
Figure 5:
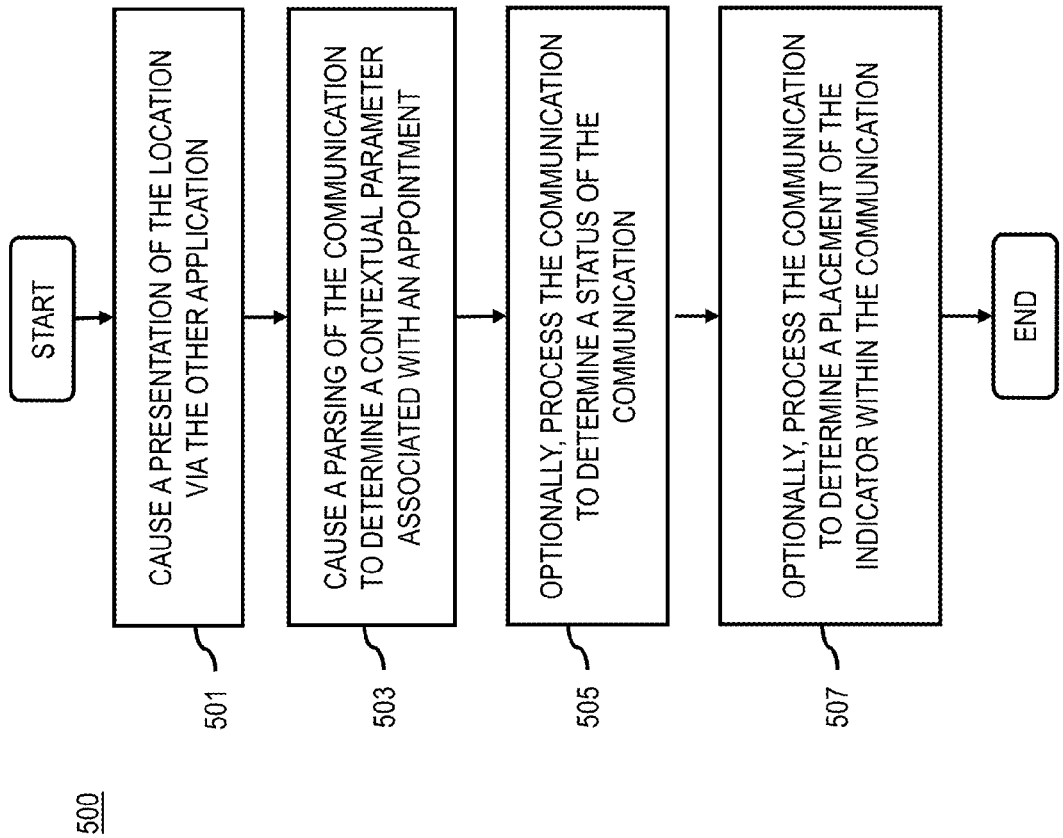
Figure 12:
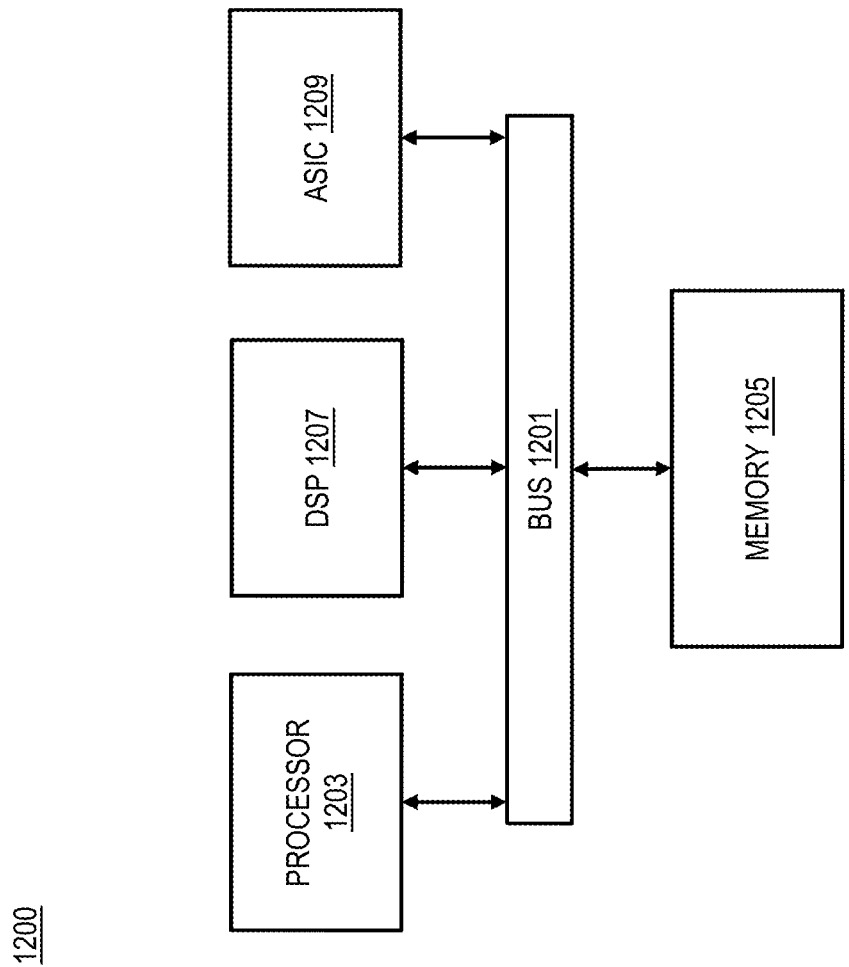
FIG. 12 is a diagram of a chip set that can be used to implement an embodiment of the invention.

FIGS. 3-5 are flowcharts of processes for parsing one or more communications to determine location details and to make those details available to one or more applications that can enable a user to determine how and when to get to a particular location, according to one embodiment. In one embodiment, the parsing module 103 performs the process 300 and is implemented in, for instance, a chip set including a processor and a memory as shown in FIG. 12. In step 301, the parsing module 103 causes, at least in part, a parsing of one or more communications to determine one or more indicators of at least one location, wherein the one or more communications are associated with at least one application. By way of example, the at least one application can include an email application, a messaging application (e.g., SMS), a voicemail application, a social networking application, etc. and the one or more communications can include an email, a text, a voicemail message, a social networking post, etc. By way of further example, the one or more indicators can include, at least in part, an address, a POI, or a common location expression (e.g., "my house," "my office," etc.). In one example use case, the communication (e.g., an email) includes the following message: "the birthday party will take place on Thursday 23$^{rd}$ of May at 6:00 p.m. at Senefelder Strasse 7, Prenzlauer Berg." Consequently, the parsing module 103 causes, at least in part, a parsing of the communication to determine the address "Senefelder Strasse 7."

In step 303, the parsing platform 103 causes, at least in part, a storage of the one or more indicators in at least one database based, at least in part, on the at least one application. By way of example, the storage of the one or more indicators is based, at least in part, on the type of application (e.g., an email application, a messaging application (e.g., SMS), a voicemail application, a social networking application, etc.) and/or the one or more services providers of the at least one application. Accordingly, in one example use case, the at least one database may include the following: Email A (2), Social Network A (3), Social Network B (0), SMS (1), and voicemail (1). In one embodiment, it is also contemplated that the span of the one or more communications may be user defined in terms of time (e.g., one or more communications received during the last day, week, month, etc.).

In step 305, the parsing platform 103 causing, at least in part, a granting of access to the at least one database to at least one other application for determining the at least one location based, at least in part, on the one or more indicators. In one example use case, the at least one other application includes, at least in part, a mapping and/or navigation application, a messaging application (e.g., SMS), a social networking application, or a combination thereof. For example, the parsing platform 103 can cause, at least in part, a granting of access to a mapping and/or navigation application so that a user can visually see, for example, how and when to get to a location contained with the one or more communications parsed by the parsing platform 103.

FIG. 4 depicts a process 400 of determining at least one location (e.g., an address of a birthday party, a restaurant reservation, an event, etc.). In one embodiment, the parsing module 103 performs the process 400 and is implemented in, for instance, a chip set including a processor and a memory as shown in FIG. 12. In step 401, the parsing platform 103 determines one or more credentials associated with the at least one application, wherein the parsing of the one or more communications is based, at least in part, on the one or more credentials. In one example use case, the one or more credentials include a login and a password associated with the at least one application. In particular, a user grants the parsing platform 103 access to one or more communications associated with the at least one application (e.g., an email application) and/or to one or more other databases associated with the user (e.g., an address book or a contacts list) to enable the parsing of the one or more communications by the parsing platform 103.

In step 403, the parsing platform 103 determines whether the one or more indicators are unambiguous, ambiguous, a point of interest, a common location expression, or a combination thereof based, at least in part, on at least one comparison of the one or more indicators against one or more entries in the at least one database, one or more other databases, or a combination thereof. By way of example, the one or more indicators are ambiguous if the indicator (e.g., an address) can be found in more than one place (e.g., two different cities). For example, in the example use case discussed above, the street address Senefelder Strasse 7 can be found in at least Berlin and Fredersdorf-Vogelsdorf as well as a number of other cities located throughout Germany. In one example use case, examples of a common location expression may include "my home," "my place," etc. In addition, in one example use case, the one or more other databases include, at least in part, a POI database, an address book or contacts list, a geo-coding database, etc.

In step 405, the parsing platform 103 determines location information associated with at least one device associated with the one or more communications. By way of example, if the at least one device is a mobile device, then the parsing platform 103 can determine the location information based, at least in part, on one or more location-based technologies (e.g., GPS, cellular triangulation, A-GPS, etc.) and if the at least one device is a desktop PC, for example, then the parsing platform 103 can determine the location of the at least one device based on its IP address.

In step 407, the parsing platform 103 causes, at least in part, at least one comparison of the one or more indicators against the location information, the one or more other databases, or a combination thereof to determine whether the one or more indicators match the location information, wherein the determining of the at least one location is further based, at least in part, on the at least one comparison. For example, in the example use case discussed above the one or more indicators included the address Senefelder Strasse 7. However, the parsing platform 103 determined that this address was ambiguous (i.e., located in more than one place). Therefore, in the previous step, the parsing platform 103 determined location information (i.e., Berlin) for the at least one device and determined that the at least one device is in Berlin. Accordingly, the parsing platform 103 compares Senefelder Strasse 7 against Berlin, the one or more other databases (e.g., a geo-coding database), or a combination thereof to determine whether the one or more indicators match the location information. Because Senefelder Strasse 7 matches the location information, the parsing platform 103 selects the matching result and causes, at least in part, a storage of the address in the at least one database (e.g., the communications database 109).

In step 409, wherein the one or more indicators are a point of interest or a common location expression, the parsing platform 103 determines the at least one location based, at least in part, on the location information, the one or more other databases, or a combination thereof. For example, if the parsing platform 103 determines that the at least one location is a POI without an address (e.g., Zoo Cafe), the parsing platform 103 first determines the location information associated with the device (e.g., Berlin) and then causes, at least in part, at least one comparison of Zoo Cafe against at least one POI database to determine whether the POI is also located in Berlin. In one embodiment, if the parsing platform 103 determines that Zoo Cafe is listed in a POI database, then it is contemplated that the POI database will also have an address or location for the Zoo Cafe, which the parsing platform 103 can then cause, at least in part, to be stored in the at least one database.

In another example use case, if the parsing platform 103 determines that the at least one location is a common location expression (e.g., "my place"), then parsing platform 103 can try to determine the sender of the one or more communications. In one embodiment, the parsing platform 103 first determines the sender of the one or more communications and then causes, at least in part, a comparison of the sender against one or more entries in one or more other databases (e.g., an address book or a contacts list). In one example use case, if the parsing platform 103 determines that the sender is among the one or more entries, then the parsing platform 103 attempts to determine a location for the sender. In one example use case, if the parsing platform 103 determines the location of the sender, then the parsing platform 103 causes, at least in part, the storage of the location (i.e., the location of the sender's place).

FIG. 5 depicts a process 500 of causing, at least in part, a storage and/or a presentation of the at least one location. In one embodiment, the parsing module 103 performs the process 500 and is implemented in, for instance, a chip set including a processor and a memory as shown in FIG. 12. In step 501, the parsing platform 103 causes, at least in part, a presentation of the at least one location via the at least one other application, wherein the presentation is based, at least in part, on the at least one application. By way of example, the at least one other application includes, at least in part, a mapping and/or navigation application, a messaging application (e.g., SMS), a social networking application, etc. In one example use case, the parsing platform 103 may present the birthday party communication discussed above as "SenefelderPlatz 7, 6:00 p.m. Sent by name@mail.com 11$^{th}$ April 3:38 p.m." in connection with a mapping and/or navigation application, for example. In one embodiment, if a user clicks on the list item, the parsing platform 103 can cause, at least in part, the mapping and/or navigation application to center the address on a map of the relevant area. In one embodiment, in addition to centering the at least one location on the map of the relevant area, the parsing platform 103 can also cause, at least in part, a presentation of the communication containing the at least one location to help the user understand the context of the location (e.g., the location of a birthday party).

In step 503, wherein the at least one location is associated with at least one appointment, the parsing platform 103 causes, at least in part, a parsing of the one or more communications to determine at least one contextual parameter associated with the at least one appointment, wherein the presentation of the at least one location is based, at least in part, on the at least one contextual parameter. By way of example, at least one appointment may be based, at least in part, on a birthday party, a dinner reservation, an event, a real-estate listing, etc. By way of further example, the at least one contextual parameter may be based, at least in part, on a date, a time, a sender, etc. More specifically, the one or more patterns used by the parsing platform 103 to parse the one or more communications also include one or more patterns related to time. In one example use case, because the parsing platform 103 determines a time (e.g., 6:00 p.m.), the parsing platform 103 presents a route from the current position of the at least one device (e.g., based on GPS) to the at least one location (e.g., the birthday party) via the at least one other application (e.g., a mapping and/or navigation application) and presents the time that the user will need to leave to be at the at least one location on time (e.g., 6:00 p.m.). In another example use case, because the parsing platform 103 determines a date (e.g., Thursday 23$^{rd}$ of May), if the parsing platform 103 determines that the date matches the current date, then the parsing platform 103 presents a route from the current position of the at least one device to the at least one location via the at least one other application.

In step 505, the parsing platform 103 optionally processes and/or facilitates a processing of the one or more communications to determine at least one status of the one or more communications, wherein the storage of the one or more indicators, the presentation of the at least one location, or a combination thereof is further based, at least in part, on the at least one status. By way of example, the at least one status includes, at least in part, "read," "unread," and/or "deleted," etc. In particular, in one embodiment, it is contemplated that the parsing platform 103 functions as a daemon and therefore can cause, at least in part, a parsing of one or more communications (e.g., emails or SMS messages) that a user has not yet read or listened to and can cause, at least in part, a storage of the one or more indicators accordingly. Further, when the parsing platform 103 causes, at least in part, a presentation of the at least one location, the parsing platform 103 can also include the status information as part of the list.

In step 507, the parsing platform 103 optionally processes and/or facilitates a processing of the one or more communications to determine at least one placement of the one or more indicators within the one or more communications, wherein the storage of the one or more indicators, the presentation of the at least one location, or a combination thereof, is further based, at least in part, on the at least one placement. By way of example, once the parsing platform 103 determines an address in one or more communications (e.g., an email), the parsing platform 103 can also determine whether the address appeared in the subject, the header, the message body, the footer, etc. of the email. In one embodiment, the parsing platform 103 can cause, at least in part, both the storage of the address along with its location in the at least one database and the parsing platform 103 can also cause, at least in part, the list to include the location as well (e.g., subject).

FIG. 6 is a diagram of a workflow for determining at least one location within one or more communications, according to various embodiments. In step 601, the system 100 causes, at least in part, a parsing of the one or more communications (e.g., an email) to determine one or more indicators of at least one location (e.g., the address "Senefelder Strasse 7"), wherein the one or more communications are associated with at least one application (e.g., an email application). In step 603, the system 100 determines whether the address (i.e., the indicator) is unambiguous, ambiguous, a POI, a common location expression, or a combination thereof based, at least in part, on at least one comparison of the indicator against one or more entries in the at least one database (e.g., the communications database 109), one or more other databases (e.g., a point of interest database, a geo-coding database, an address book or contacts list, etc.), or a combination thereof. In one embodiment, if the system 100 determines in step 605 that the determined address is unambiguous, then the system 100 causes, at least in part, a storage of the indicator in the at least one database in step 607 based, at least in part, on the at least one application (e.g., an email application) and then continues to determine one or more contextual parameters associated with the one or more indicators.

In one embodiment, if the system 100 determines, however, in step 605 that the address is ambiguous as is the case with Senefelder Strasse 7, which can be found in a number of cities throughout Germany (e.g., Berlin, Fredersdorf-Vogelsdorf, etc.), then the system 100 determines location information associated with at least one device associated with the one or more communications (e.g., a mobile phone that receives the one or more communications). In one embodiment, the system 100 determines the location information based, at least in part, on one or more location-based technologies (e.g., GPS, cellular triangulation, A-GPS, etc.) in step 609. In step 611, the system 100 determines based, at least in part, on GPS coordinates, for example, that the at least one device is in Berlin. In step 613, the system 100 causes, at least in part, at least one comparison of the address Senefelder Strasse 7 against the location information (e.g., Berlin), the one or more other databases (e.g., a geo-coding database), or a combination thereof to determine whether the one or more indicators match the location information. In one embodiment, if the system 100 determines a match in step 613, then the system 100 selects the matching result in 615 and causes, at least in part, the storage of the indicator as discussed in step 607. However, if the system 100 does not determine a match, then in step 617, the system 100 causes, at least in part, a storage of all resulting addresses to the at least one database and continues to determine one or more contextual parameters associated with the one or more indicators.

FIG. 7 is a diagram of a workflow where the system 100 determines that the one or more indicators is a POI, according to various embodiments. In step 701, as a result of parsing the one or more communications (e.g., an email), the system 100 determines a POI (e.g., Zoo Cafe). In step 703, the system 100 determines the at least one location of the POI based, at least in part, on location information associated with the at least one device (e.g., a mobile phone that received the particular communication) based, at least in part, on one or more location-based technologies (e.g., GPS). In step 705, the system 100 determines that the at least one device is located in Berlin. In step 707, the system 100 causes, at least in part, at least one comparison of the POI against one or more POI databases to determine whether the POI is also located in Berlin. If the system 100 finds the POI in the one or more POI databases in step 709, then the system 100 causes, at least in part, a presentation of the at least one location via the at least one other application (e.g., a mapping and/or navigation application) in a step 711. However, if the system 100 determines in step 709 that the POI does not match the one or more POI databases, then in step 713, the system 100 does not cause, at least in part, a presentation of the location via at least one other application (e.g., a mapping and/or navigation application) based, at least in part, on the one or more POI databases including the address or location of the determined POI.

FIG. 8 is a diagram of a workflow where the system 100 determines that the one or more indicators is a common location expression, according to various embodiments. In step 801, as a result of parsing the one or more communications (e.g., an email), the system 100 determines the common location expression "my place." In step 803, the system 100 first determines the sender of the one or more communications and then causes, at least in part, a comparison of the sender against one or more entries in an address book or a contacts list of the user associated with the at least one device that received the particular communication. If the system 100 is able to determine a match in step 805, then in step 807, the system 100 attempts to find a home address for the sender. If the system 100 is able to determine an address in step 809, then in step 811, the system 100 causes, at least in part, a storage of the address in the at least one database (i.e., the address of the sender's place) and continues to determine one or more contextual parameters associated with the one or more indicators. If, however, the system 100 is unable to find an address in step 809, then in step 813, the system 100 does not cause, at least in part, a presentation of the at least one location via at least one other application (e.g., a mapping and/or navigation application). Similarly, if the system 100 is unable to match the sender with one or more entries in the user's address book or contacts list in step 805, then in step 813, the system 100 also does not cause, at least in part, a presentation of at least one location.

Figure 9:
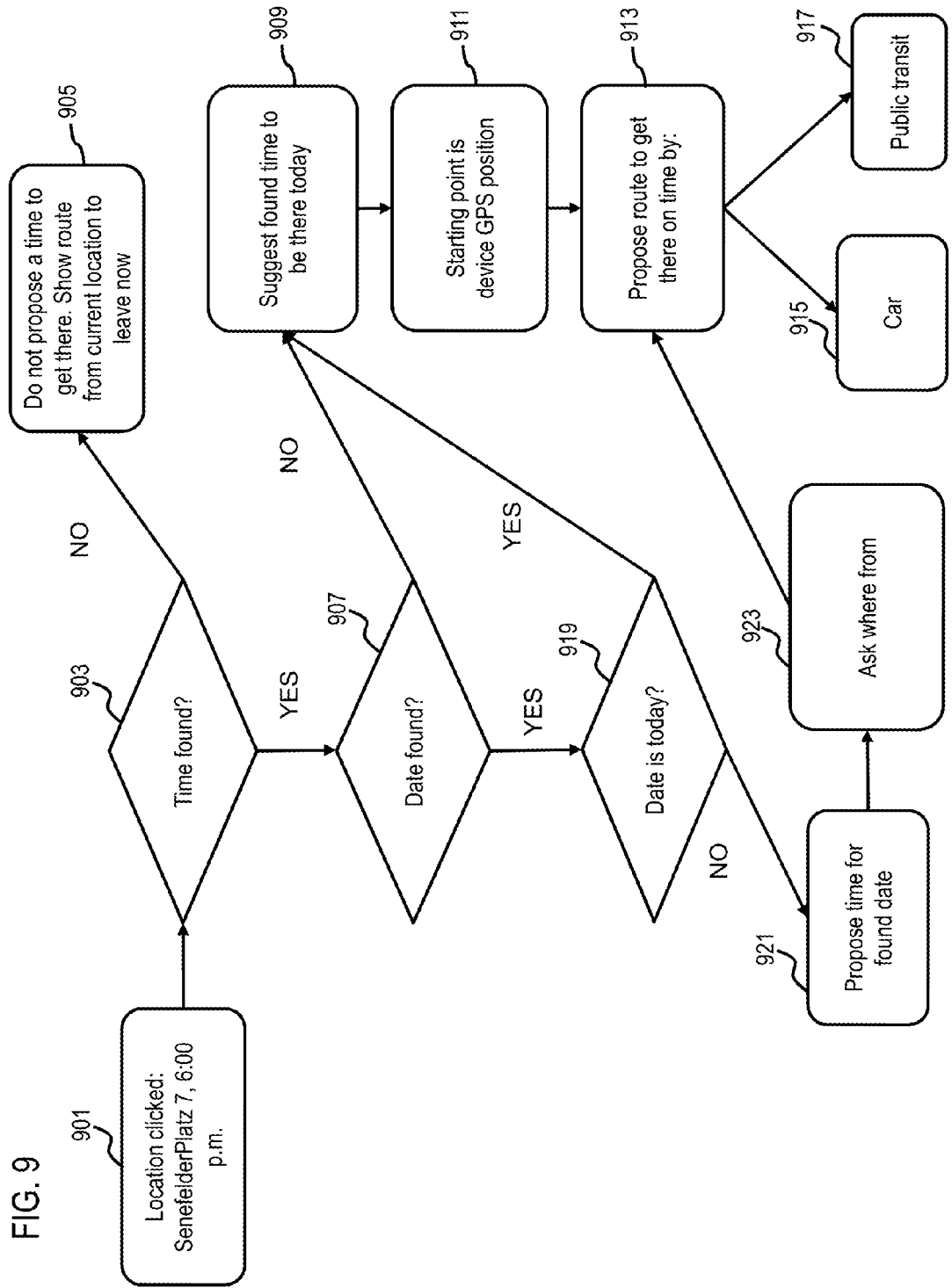
FIG. 9 is a diagram of a workflow for displaying at least one location, according to various embodiments.

FIG. 9 is a diagram of a workflow for causing, at least in part, a presentation of at least one location via at least one other application (e.g., a mapping and/or navigation application). In step 901, as a result of parsing the one or more communications, the system 100 determines at least one location (e.g., SenefelderPlatz 7). Once the system 100 determines the at least one location in step 901, in step 903, the system 100 causes, at least in part, a parsing of the one or more communications to determine at least one contextual parameter associated with the at least one location (e.g., a date, a time, a sender, etc.). In particular, in step 903, the system 100 attempts to determine at least one time. If the system 100 is unable to determine at least one time in step 903, then in step 905, the system does not propose a time for a user to get from his or her current location to the at least one location determined by the system 100 in step 901, but simply causes, at least in part, the presentation of the at least one location via the at least one other application (e.g., a mapping and/or navigation application) as though the user was leaving immediately. However, if the system 100 is able to determine a time in step 903, then in step 907, the system 100 attempts to determine at least one date associated with the at least one location. In one embodiment, if the system 100 is unable to determine a date, then in step 909, the system 100 proposes a time for the user to arrive at 6:00 p.m. at the at least one location on the current date. Moreover, in step 911, the system 100 causes, at least in part, the presentation of the at least one location via the at least one other application (e.g., a mapping and/or navigation application) based, at least in part, on the current GPS position of the at least one device. Further, in step 913, the system 100 can propose a route between the at least one location determined in step 901 and the current location of the at least one device determined in step 911 based, at least in part, on the user taking a car as depicted in step 915 and/or public transportation (e.g., a bus or subway) as depicted in step 917.

In one embodiment, if the system 100 determines a date within the communication in step 907, then in step 919, the system 100 determines whether the date matches the current date. If the system 100 determines that the date is the current date in step 919, then the system 100 follows the work flow as discussed in steps 909-917. However, if system 100 determines that the date is not the current date in step 919, then in step 921, the system 100 can propose a time for the user to leave so that he or she will arrive at the at least one location at 6:00 p.m. on the specified date. In addition, in step 923, the system 100 can query the user to see whether he or she plans to leave from the current location as determined in step 911 or if the user plans to leave from another location. Once the system determines the relevant starting point, the system 100 follows the work flow as discussed in steps 913-917.

Figure 10:
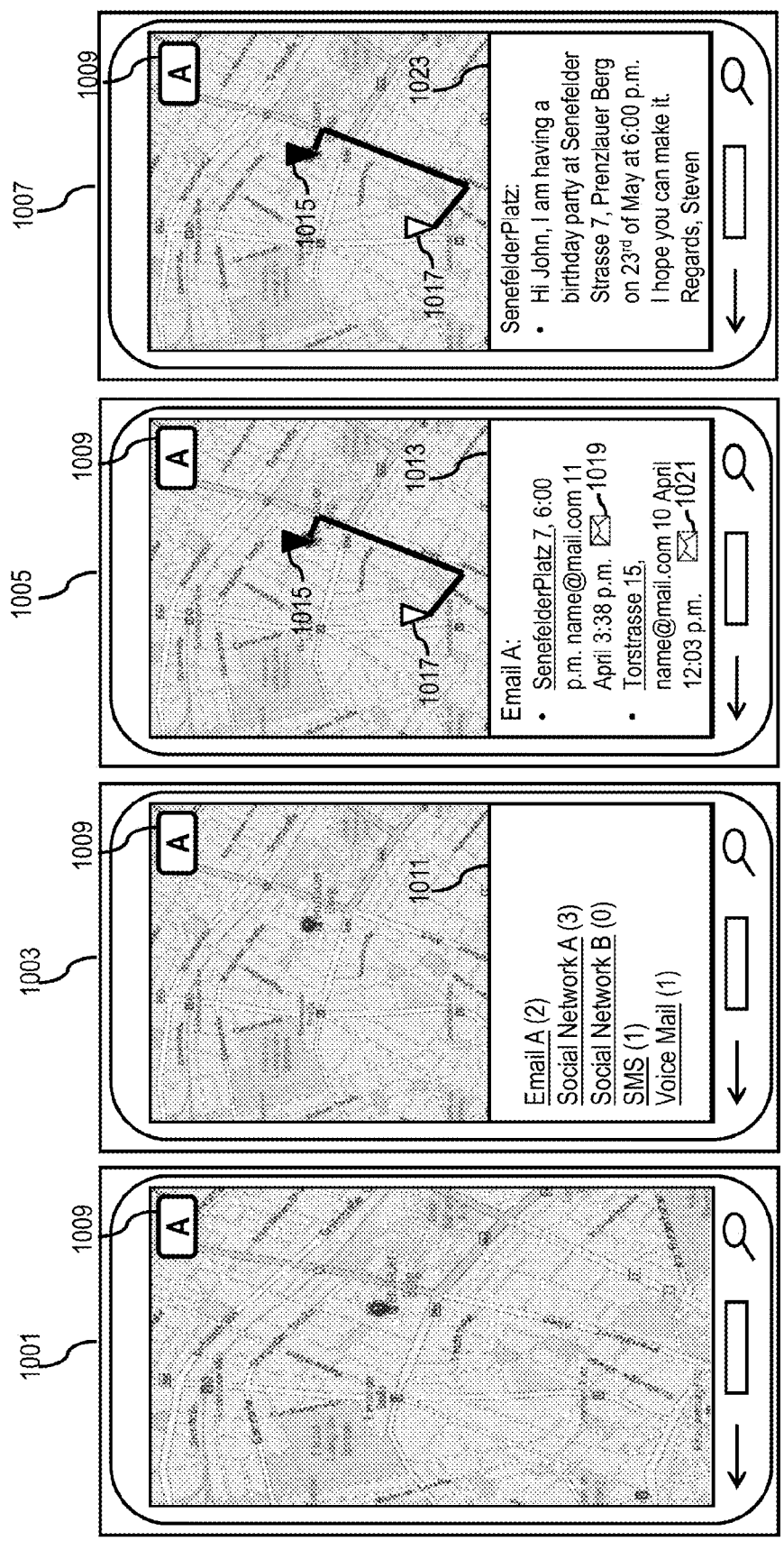
FIG. 10 is a diagram of user interfaces utilized in the processes of FIGS. 3-5, according to various embodiments.

FIG. 10 is a diagram of user interfaces utilized in the processes of FIGS. 3-5, according to various embodiments.

As shown, the example user interfaces of FIG. 10 include one or more user interface elements and/or functionalities created and/or modified based, at least in part, on information, data, and/or signals resulting from the processes (e.g., processes 300, 400, and 500) described with respect to FIGS. 3-5. More specifically, FIG. 10 illustrates user interfaces (e.g., interfaces 1001, 1003, 1005, and 1007) of a mobile device (e.g., a mobile phone) causing, at least in part, a presentation of the at least one location via at least one other application (e.g., a mapping and/or navigation application). More specifically, in one embodiment, the interface 1001 features a mapping and/or navigation application that includes at least one interactive interface element 1009 (e.g., "A") for determining recent addresses found by the system 100 in one or more communication channels in the last day, week, month, etc., for example. In one embodiment, it is contemplated that the span of the one or more communications can be configured by the user.

In one embodiment, as a result of determining one or more interactions with the interface element 1009, the system 100 causes, at least in part, a presentation of an information window 1011 to be placed on top of the mapping and/or navigation application as depicted in interface 1003. In one embodiment, it is contemplated that the information window 1011 can be configured by user (e.g., appearing on the bottom of the interface display, appearing on the top of the interface display, appearing semi-transparent so that the mapping and/or navigation application is still partially visible below, etc.). In particular, the information window 1011 of interface 1003 depicts the specific number of the one or more communications containing location information recently received by the user as well as the particular communication channels or applications by which the one or more communications where received.

In one or more embodiments, as a result of determining one or more interactions with one or more of the lists of communication channels as presented in the information window 1011 (e.g., "Email A"), the system 100 causes, at least in part, a presentation of another information window 1013 as depicted in interface 1005 that includes the determined locations SenefelderPlatz and Torstrasse that correspond to Email A. In one embodiment, once the system 100 determines one or more interactions with the at least one location (e.g., SenefelderPlatz), the system 100 causes, at least in part, a presentation of the at least one location 1015 in reference to the current location 1017 of the interface 1005, for example, based, at least in part, on one or more location-based technologies (e.g., GPS, cellular triangulation, A-GPS, etc.).

In one embodiment, it is contemplated as a result of determining one or more interactions with the interactive interface elements 1019 and 1021 associated with the locations SenefelderPlatz and Torstrasse, respectively, the system 100 can cause, at least in part, a presentation of the original communication within which the location was contained as depicted in the information window 1023 of interface 1007. Similar to the information window 1011, in one embodiment, it is contemplated that the information windows 1013 and 1023 can also be configured by a user (e.g., appearing on the bottom of the interface display, appearing on the top of the interface display, appearing semi-transparent so that the mapping and/or navigation application is still partially visible below, etc.). In one embodiment, if the system 100 determines one or more further interactions with the interface element 1009, then the system 100 can cause, at least in part, the information windows 1011, 1013, and 1023 to close and the full view of the mapping and/or navigation application of interface 1001 can resume.

The processes described herein for parsing one or more communications to determine location details and to make those details available to one or more applications that can enable a user to determine how and when to get to a particular location may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
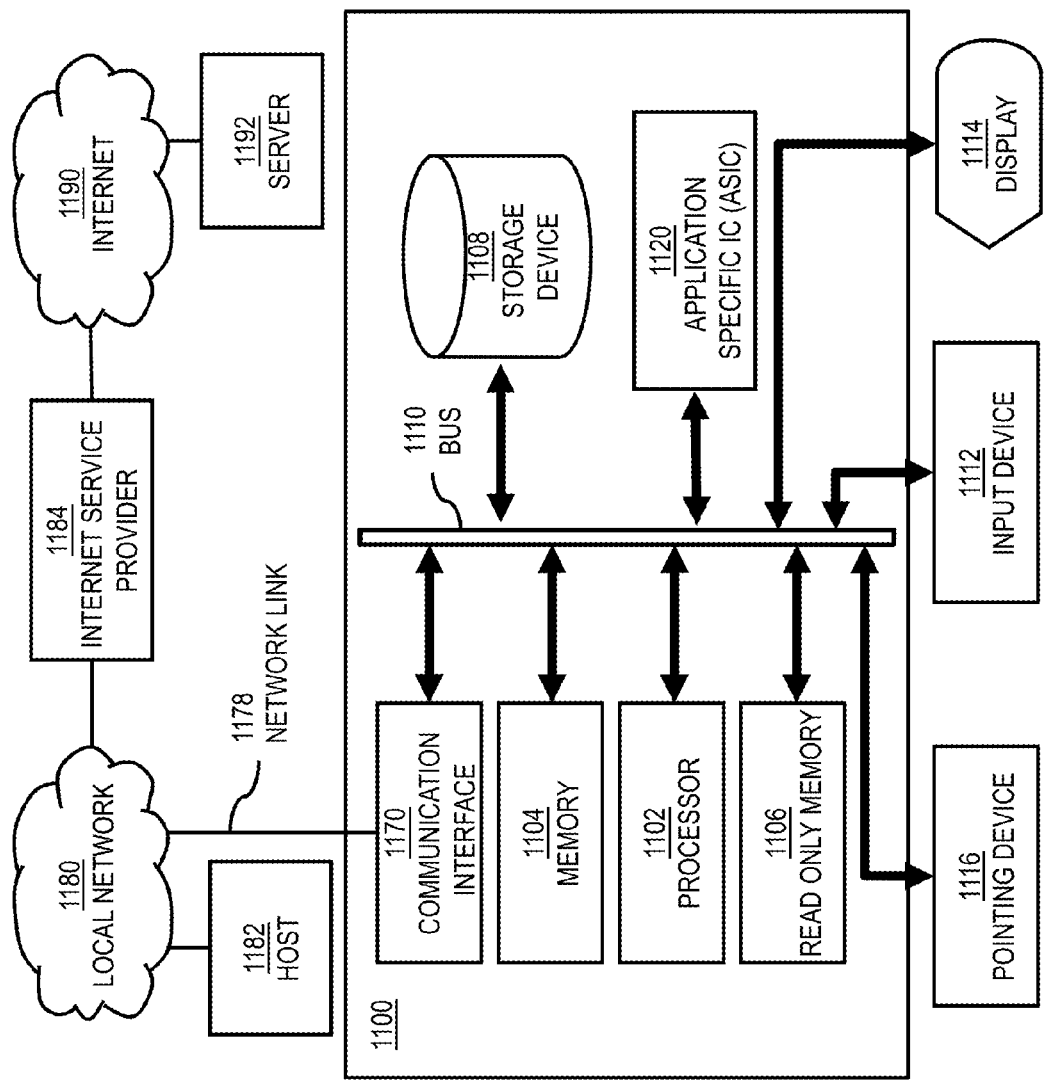
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to parse one or more communications to determine location details and to make those details available to one or more applications that can enable a user to determine how and when to get to a particular location as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of parsing one or more communications to determine location details and to make those details available to one or more applications that can enable a user to determine how and when to get to a particular location.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to parse one or more communications to determine location details and to make those details available to one or more applications that can enable a user to determine how and when to get to a particular location. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for parsing one or more communications to determine location details and to make those details available to one or more applications that can enable a user to determine how and when to get to a particular location. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for parsing one or more communications to determine location details and to make those details available to one or more applications that can enable a user to determine how and when to get to a particular location, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for parsing one or more communications to determine location details and to make those details available to one or more applications that can enable a user to determine how and when to get to a particular location to the UEs 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to parse one or more communications to determine location details and to make those details available to one or more applications that can enable a user to determine how and when to get to a particular location as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of parsing one or more communications to determine location details and to make those details available to one or more applications that can enable a user to determine how and when to get to a particular location.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to parse one or more communications to determine location details and to make those details available to one or more applications that can enable a user to determine how and when to get to a particular location. The memory 1205 also stores the data associated with or generated by the execution of the inventive steps.

Figure 13:
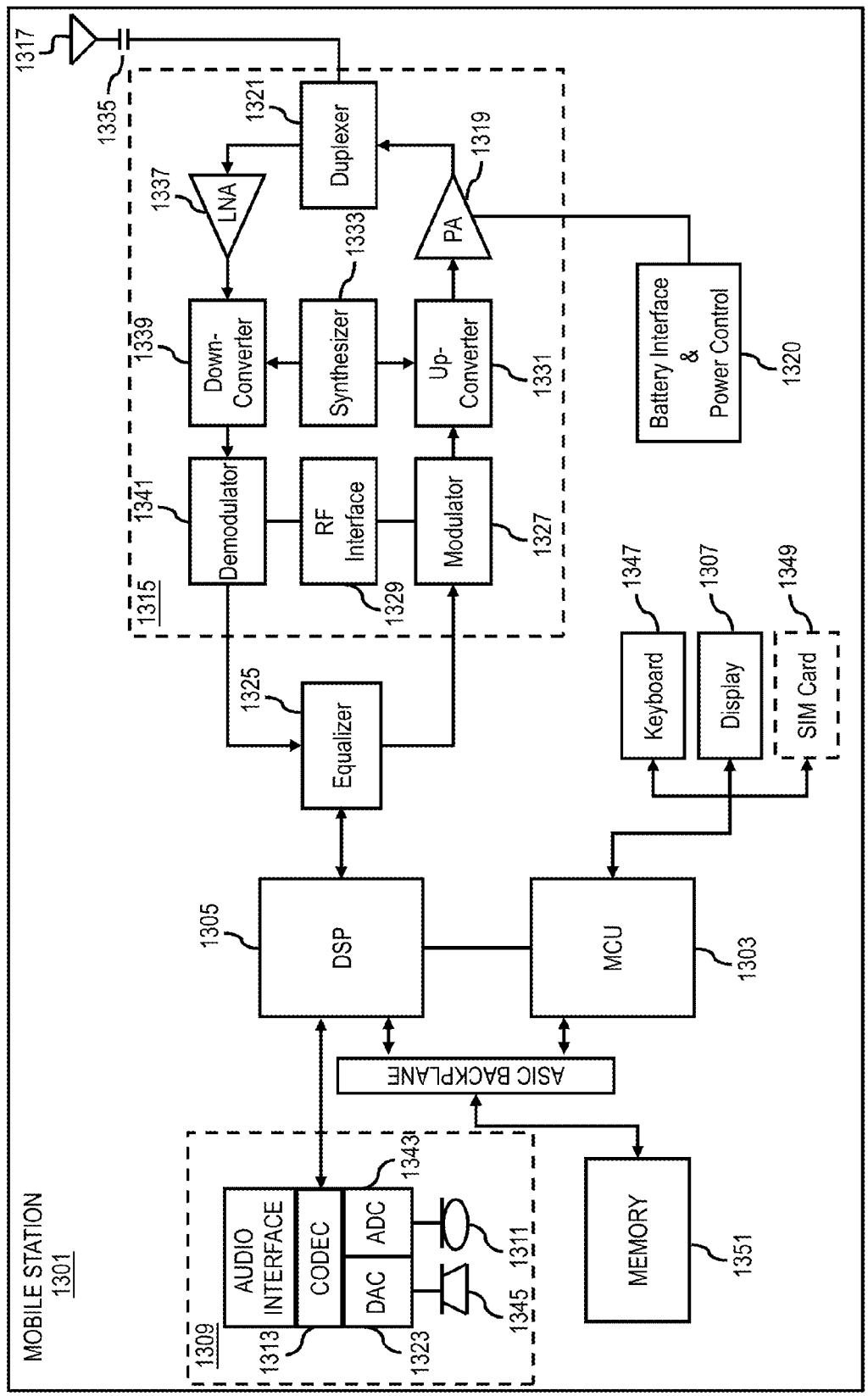
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of parsing one or more communications to determine location details and to make those details available to one or more applications that can enable a user to determine how and when to get to a particular location. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of one or more applications and mobile terminal functions that perform or support the steps of parsing one or more communications to determine location details and to make those details available to one or more applications that can enable a user to determine how and when to get to a particular location. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to parse one or more communications to determine location details and to make those details available to one or more applications that can enable a user to determine how and when to get to a particular location. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1343 and DAC 1323. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    parsing, by an apparatus, a plurality of communications to identify location information in the communications, wherein the communications are associated with a plurality of applications of different communication channels on the apparatus, wherein the communication channels include at least two of email, short message service, voicemail, and social networking;
    automatically counting, per communication channel, a corresponding number of communications identified with the location information among the communications;
    automatically granting, by the apparatus, at least one other application on the apparatus access to the location information based on the parsing, wherein the at least one other application is a map application;
    automatically rendering, at a user interface of the apparatus, a first presentation in the map application of a list of the communication channels and the corresponding number of communications;
    parsing, in response to a user selection of one of the communication channels, event location information and event time information associated with one or more appointments corresponding to one or more communications within the selected communication channel;
    rendering a second presentation in the map application of a current location of the apparatus and a list of event locations and respective event times corresponding to the communications within the selected communication channel, wherein the current location is determined based on a global positioning system receiver of the apparatus; and
    in response to a determination that one of the event times corresponding to one of the communications within the selected communication channel matches a current date, rendering a third presentation in the map application of content of the respective communication and routing information from the current location of the apparatus to the event location corresponding to the current date.

2. A method of claim 1, further comprising:
    determining whether the location information is ambiguous, and whether the location information includes a point of interest, a common location expression, or a combination thereof based, at least in part, on at least one comparison of one or more location indicators against one or more entries in one or more databases.

3. A method of claim 2, wherein the location information is ambiguous, the method further comprising:
    determining the one or more location indicators associated with the apparatus that conducts the communications; and
    comparing the location information against the one or more location indicators, the one or more databases, or a combination thereof to determine whether the location information match the one or more location indicators,
    wherein the location is determined based, at least in part, on the at least one comparison.

4. A method of claim 1, wherein the plurality of applications includes one or more social networking applications, and the communications include one or more social networking posts.

5. A method of claim 1, further comprising:
in response to a user selection of one of the event locations corresponding to one of the communications within the selected communication channel, determining that there is no event time information available for the event location corresponding to the selected communication; and
assuming that the user is leaving now for the event location corresponding to the selected communication, and rendering a fourth presentation in the map application of content of the selected communication and routing information from the current location of the apparatus to the event location corresponding to the selected communication,
wherein the routing information includes departure time information.

6. A method of claim 2, wherein the location information includes a point of interest or a common location expression, the method further comprising:
determining the location based, at least in part, on the location information, the one or more other databases, or a combination thereof.

7. A method of claim 1, further comprising:
processing the communications to determine at least one status of the communications,
wherein the presentation of the location is further based, at least in part, on the at least one status.

8. A method of claim 1, further comprising:
determining one or more credentials associated with a user of the applications,
wherein the parsing of the communications is based, at least in part, on the one or more credentials.

9. A method of claim 1, further comprising:
processing the communications to determine at least one placement of the location information within the communications,
wherein the presentation of the location is further based, at least in part, on the at least one placement.

10. A method of claim 1, wherein the parsing of the communications occurs in real-time, periodically, according to a schedule, on demand, or a combination thereof.

11. An apparatus comprising:
at least one processor; and
at least one memory including computer program code for one or more programs,
the at least one memory and the computer program code configured to, with the at least one processor, cause the apparatus to perform at least the following,
parse a plurality of communications to identify location information in the communications, wherein the communications are associated with a plurality of applications of different communication channels on the apparatus; automatically count, per communication channel, a corresponding number of communications identified with the location information among the communications, wherein the communication channels include at least two of email, short message service, voicemail, and social networking;
automatically grant at least one other application on the apparatus access to the location information based on the parsing, wherein the at least one other application is a map application;
automatically render, at a user interface of the apparatus, a first presentation in the map application of a list of the communication channels and the corresponding number of communications;
parse, in response to a user selection of one of the communication channels, event location information and event time information associated with one or more appointments corresponding to one or more communications within the selected communication channel;
render a second presentation in the map application of a current location of the apparatus and a list of event locations and respective event times corresponding to the communications within the selected communication channel, wherein the current location is determined based on a global positioning system receiver of the apparatus; and
in response to a determination that one of the event times corresponding to one of the communications within the selected communication channel matches a current date, render a third presentation in the map application of content of the respective communication and routing information from the current location of the apparatus to the event location corresponding to the current date.

12. An apparatus of claim 11, wherein the apparatus is further caused to:
determine whether the location information is ambiguous, and whether the location information includes a point of interest, a common location expression, or a combination thereof based, at least in part, on at least one comparison of one or more location indicators against one or more entries in one or more databases.

13. An apparatus of claim 12, wherein the location information is ambiguous and wherein the apparatus is further caused to:
determine the one or more location indicators associated with the apparatus that conducts the communications; and
compare the location information against the one or more location indicators, the one or more databases, or a combination thereof to determine whether the location information match the one or more location indicators,
wherein the location is determined based, at least in part, on the at least one comparison.

14. An apparatus of claim 11, wherein the plurality of applications includes one or more social networking applications, and the communications include one or more social networking posts.

15. An apparatus of claim 11, wherein the apparatus is further caused to:
in response to a user selection of one of the event locations corresponding to one of the communications within the selected communication channel, determine that there is no event time information available for the event location corresponding to the selected communication; and
assume that the user is leaving now for the event location corresponding to the selected communication, and render a fourth presentation in the map application of content of the selected communication and routing information from the current location of the apparatus to the event location corresponding to the selected communication,
wherein the routing information includes departure time information.

16. An apparatus of claim 12, wherein the location information includes a point of interest or a common location expression and wherein the apparatus is further caused to:

determine the location based, at least in part, on the location information, the one or more other databases, or a combination thereof.

17. An apparatus of claim 11, wherein the apparatus is further caused to:
   process the communications to determine at least one status of the communications,
   wherein the presentation of the location is further based, at least in part, on the at least one status.

18. An apparatus of claim 11, wherein the apparatus is further caused to:
   determine one or more credentials associated with a user of the applications,
   wherein the parsing of the communications is based, at least in part, on the one or more credentials.

19. An apparatus of claim 11, wherein the apparatus is further caused to:
   process the communications to determine at least one placement of the location information within the communications,
   wherein the presentation of the location is further based, at least in part, on the at least one placement.

20. An apparatus of claim 11, wherein the parsing of the communications occurs in real-time, periodically, according to a schedule, on demand, or a combination thereof.

* * * * *